(12) United States Patent
Bondu

(10) Patent No.: US 6,536,496 B1
(45) Date of Patent: Mar. 25, 2003

(54) TIRE HAVING CROWN REINFORCEMENT WITH PROFILED ELEMENT AND EDGING RUBBER

(75) Inventor: Lucien Bondu, La Roche Noire (FR)

(73) Assignee: Compagnie Générale des Etablissements Michelin & Cie, Clermont-Ferrand Cedex (FR)

( * ) Notice: Subject to any disclaimer, the term of this patent is extended or adjusted under 35 U.S.C. 154(b) by 106 days.

(21) Appl. No.: 09/631,734

(22) Filed: Aug. 4, 2000

Related U.S. Application Data

(63) Continuation of application No. PCT/EP99/00652, filed on Feb. 2, 1999.

(30) Foreign Application Priority Data

Feb. 5, 1998 (FR) .............................. 98 01454

(51) Int. Cl.⁷ .............................. B60C 9/18; B60C 9/20
(52) U.S. Cl. .............................. 152/532; 152/537
(58) Field of Search .............................. 152/532, 537

(56) References Cited

U.S. PATENT DOCUMENTS

| | | |
|---|---|---|
| 4,696,335 A | 9/1987 | Tsukagoshi et al. |
| 5,779,828 A | 7/1998 | Okamoto |

FOREIGN PATENT DOCUMENTS

| | | |
|---|---|---|
| EP | 0 785 095 A1 * | 7/1997 |
| FR | 2671516 | 7/1992 |
| GB | 1067856 | 5/1967 |
| GB | 1462656 | 1/1977 |

OTHER PUBLICATIONS

Derwent Publications Ltd., London, GB, AN 92–346504, XP–002081857 & JP04 252705, Yokohama Rubber Co. Ltd., Sep. 8, 1992, Abstract.

* cited by examiner

Primary Examiner—Adrienne C. Johnstone
(74) Attorney, Agent, or Firm—Baker Botts L.L.P.

(57) ABSTRACT

A tire having a radial carcass reinforcement, which is surmounted by a crown reinforcement including at least two plies of reinforcement elements, which are crossed from one ply to the next, the two plies being of unequal axial widths, characterized in that each edge of the ply which is axially least wide is separated from the axially widest ply by a profiled element P of rubber mix, the profiled element P itself being separated from the liner C of the least wide ply by an edging rubber G, the profiled element P, the edging rubber G and the liner C having respectively moduli of elasticity at 10% elongation MP, MG, MC such that $MC \geq MG > MP$.

4 Claims, 1 Drawing Sheet

TIRE HAVING CROWN REINFORCEMENT WITH PROFILED ELEMENT AND EDGING RUBBER

This is a continuation of PCT/EP99/00652, filed Feb. 2, 1999.

BACKGROUND OF INVENTION

The invention relates to a tire with radial carcass reinforcement, and more particularly to a tire intended to be fitted on vehicles bearing heavy loads and traveling at sustained speed, such as, for example, lorries, tractors, trailers or highway buses.

The carcass reinforcement is anchored on either side to at least one bead wire, and is surmounted radially by a crown reinforcement comprising at least two so-called working plies which are superposed and formed of cords or cables which are parallel within each ply and are crossed from one ply to the next, forming angles of at most 45° in absolute value with the circumferential direction of the tire. It also generally comprises a ply of metal cords or cables of low extensibility which form an angle of between 45° and 90° with the circumferential direction, this ply, called a triangulation ply, being radially located between the carcass reinforcement and the first, so-called working, crown ply. The triangulation ply forms with the two working piles a triangulated reinforcement which has little deformation under the different stresses to which it is subjected, the essential role of the triangulation ply being to take up the transverse compressive forces to which all the reinforcements in the zone of the crown of the tire are subjected.

Certain current tires, referred to as "highway" tires, are intended to travel at high speed and on increasingly long journeys, owning to the improvement in road networks and the growth in the motorway networks throughout the world. All the conditions under which such a tire is required to travel without doubt permits an increase in the number of kilometers traveled, the wear of the tire being less; on the other hand, the endurance of the latter, and in particular of the crown reinforcement, is greatly impaired.

The stresses existing at the level of the crown reinforcement, and more particularly the shearing stresses between the two working crown piles, combined with a non-negligible increase in the operating temperature at the ends of the shortest working ply, result in the appearance and propagation of cracking of the rubber at said ends, despite the presence of a thickened layer of rubber at the junction of the edges of the working crown plies. The same problem exists in the case of edges of two plies having reinforcement elements, crossed from one ply to the other ply, said other ply not necessarily being radially adjacent to the first.

In order to overcome the above disadvantages and to improve the life of the crown reinforcement of the type of tire in question, a certain number of prior patents claim solutions relating to the structure and quality of the layers and/or profiled elements of rubber mixes which are arranged between and/or around the ends of working plies, and more particularly the ends of the shortest working ply.

French Patent 1 389 428, to improve the resistance to degradation of the rubber mixes located in the vicinity of the edges of the crown reinforcement, advocates the use, in combination with a tread of low hysteresis, of a rubber profiled element covering at least the sides and the marginal edges of the crown reinforcement and formed of a rubber mix of low hysteresis.

French Patent 2 222 232, in order to avoid separations between crown reinforcement plies, teaches coating the ends of the reinforcement with a pad of rubber, the Shore A hardness of which differs from that of the tread surmounting said reinforcement, and is greater than the Shore A hardness of the profiled element of rubber mix arranged between the edges of crown reinforcement plies and the carcass reinforcement.

U.S. Pat. No. 5,154,217 uses a different unit of measurement, and claims arranging between the ends of two plies, in the extension of the ply between said two plies, a pad of rubber mix, the elasticity modulus of which at 100% elongation is greater than the modulus of the same name of the tread.

To effect joining of the respective two edges of two crown reinforcement plies, French Patent 2 298 448 discloses the use of so-called shearing rubbers between said edges, of a high Shore A hardness and elasticity modulus at 100%, this use being combined with the use of anisotropic rubber strips arranged between the edges of the crown reinforcement and the carcass reinforcement.

The same applies to the case of joining of the crown reinforcement plies described in French Patent 2 499 912, the lateral part of the rubber layer arranged between the two main plies of the crown reinforcement being formed of a rubber mix of high Shore hardness.

Other solutions have been considered for improving the resistance to separation of the crown reinforcement plies, which solutions consist in coating at least one end of the axially least wide ply in at least one layer of rubber mix, whether or not reinforced by reinforcement elements. In the case of a single layer, the latter is advantageously turned up over the end of the ply, as described and illustrated, for example, in document FR 1 226 595, where the layer is reinforced by very fine metal wires, or in document JP 266 703, the protective layer being constituted solely of rubber of a high elasticity modulus, or alternatively in French Patent 2 671 516. European application EP 0 785 095 A1 relates to a tire for heavy vehicles, and more particularly to a crown reinforcement for such a tire, formed of at least three plies, two of said plies being composed of crossed elements. Said application teaches providing the edges of the shortest crown ply with an edging rubber, the tensile modulus of which at 100% relative elongation is greater than that of the coating mix for the reinforcement elements, whereas the layer of rubber mix arranged between the edges of plies has a lower modulus than the modulus of said coating mix.

The various structures listed above did not provide a completely satisfactory solution under conditions of travel which are highly disadvantageous to the tire.

SUMMARY OF THE INVENTION

According to the invention, the tire having a radial carcass reinforcement, which is anchored within each bead to at least one bead wire, and is surmounted by a crown reinforcement comprising at least two plies of reinforcement elements, which are parallel to each other within each ply and are crossed from one ply to the next, said two plies being of unequal axial widths, each edge of the ply which is axially less wide of at least a pair of crossed plies being separated from the axially widest ply of the same pair by a profiled element P of rubber mix, the axially outer end of which is located at a distance from the equatorial plane of the tire which is at least equal to the distance between said plane and the end of the widest ply, said profiled element P itself being separated from the liner C contacting the reinforcement elements of the least wide ply by an edging rubber G, the axially outer end of which is located at a distance from said plane which is at least equal to half the width of the least wide ply, is characterized in that said profiled element P, said edging rubber G and said liner C have respectively secant moduli of elasticity under tension at 10% relative elongation MP, MG, MC such that MC≧MG>MP, the thickness of the edging rubber G being at least equal to 15% of the total thickness of rubber mix between generatrices of cables respectively of the two plies.

The edging rubber G will have its axially inner end preferably located at a distance from the equatorial plane which is at most equal to the distance between said plane and the axially inner end of said profiled element P.

Said edging rubber G may be turned up around the edge of the least wide crown ply of the two crossed plies in question, so as to coat completely the ends of the reinforcement elements forming said least wide crown reinforcement ply.

The thickness of the profiled element P, measured at the end of the least wide ply of the two plies in question, will preferably be between 30% and 80% of the total thickness of rubber mix between generatrices of cables respectively of the two plies: a thickness of less than 30% does not make it possible to obtain convincing results, and a thickness of more than 80% is useless with regard to the improvement in the resistance to separation between plies and is disadvantageous from the point of view of cost.

The characteristics of the invention will be better understood with reference to the following description, which refers to the drawings, which illustrate examples of embodiment in non-limitative manner.

DESCRIPTION OF PREFERRED EMBODIMENTS

Figure 1:
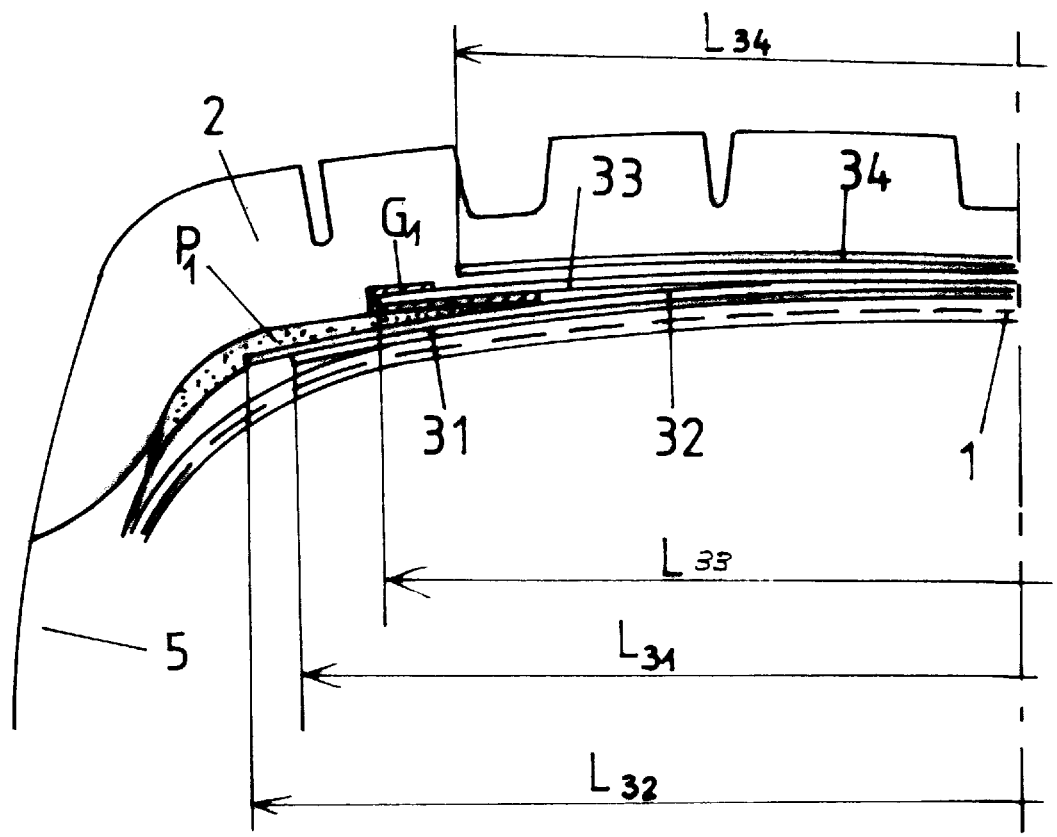
FIG. 1 is a schematic of a tire crown according to the invention.

The tire according to the invention, of dimension 385/65 R 22.5, has a form ratio H/S substantially equal to 0.65, H being the height of the tire on its rim and S the maximum axial width of said tire mounted on its operating rim 11.75× 22.5 and inflated to a recommended pressure of 9 bar.

Said tire primarily comprises a carcass reinforcement formed, in the case described, of a single ply 1 of metal cables made of steel, capable of resisting a tensile force very much greater than the tensile force generated by the inflation pressure of the tire. This carcass ply 1, which is isolated from the inflation gas by the inner layers of rubber, as is known per se, is anchored within each bead to at least one bead wire (not shown) and surmounted radially to the outside by a crown reinforcement. Said crown reinforcement is formed, radially from the inside to the outside, of a so-called triangulation ply 31 formed of inextensible metal cables made of steel forming with the circumferential direction of the tire an angle which may be between 50° and 90°, in the case in question equal to 50° and said to be oriented to the right. Said ply 31 has an axial width $L_{31}$, of 270 mm. The ply 31 is radially surmounted by the first working ply 32, formed of inextensible metal cables made of steel, which makes it possible to have a rigidity upon extension per unit of width, perpendicular to the direction of the cables, at least equal to the rigidity upon extension per unit width of the ply 31, said cables forming with the circumferential direction an angle of 18°, which is said to be oriented to the right, that is to say having the same orientation as the cables of the ply 31. The ply 32 has a width $L_{32}$ of 280 mm, such that its ends are farther from the equatorial plane than the ends of the ply 31.

The first working crown ply 32 is itself surmounted radially to the outside by a second working ply 33, formed of the same metal cables made of steel as those of the working ply 32, and consequently having the same rigidity of extension per unit of length, said cables forming with the circumferential direction an angle of 18°, said to be oriented to the left, the cables of this second working ply being crossed with the cables of the first working ply. The width $L_{33}$ of the second, radially outer, working ply 33, equal to 260 mm, is 20 mm less than the width $L_{32}$, so that there is an axial distance of 10 mm between each end of the first ply 32 and each end of the second ply 33.

The two working plies 32 and 33 have respectively liners $C_1$, and $C_2$ (shown in FIG. 2) formed of the same rubber mix.

The so-called protective ply 34 finishes off the crown reinforcement. Composed of so-called elastic metal cables, that is to say those having a relative elongation of at least 2% under a force equal to 10% of the breaking load (whereas an elongation of less than 2% is the characteristic of an inextensible cable) and forming with the circumferential direction an angle of 18°, equal to the angle formed by the cables of the second working ply 33, and oriented in the same direction as the direction taken by the cables of the second working ply 33, the ply 34 has a width $L_{34}$ of 212 mm, that is to say less than $L_{33}$ and $L_{32}$.

The tire is finished off by a tread 2, joined to the beads of the tire by sidewalls 5.

Between the first working ply 32, which is axially the wider of the two, and the second working ply 33, which is axially the least wide, there is a profiled element of rubber mix $P_1$, of triangular shape and arranged such that it is inserted between the edges of said working plies over an axial width I corresponding to a value of between 5% and 10% of the width $L_{33}$ of the shortest working ply 33. Said least wide ply 33 has each of its ends covered with an edging rubber $G_1$, said rubber being turned up over the end of the ply so as to cover the edge of said ply radially above and radially below, the axially inner end of the strand of the edging rubber radially below the ply 33 being located at a distance from the equatorial plane which is slightly less than the distance between said plane and the axially inner end of the profiled element $P_1$, and the axially inner end of the strand of the edging rubber radially above the ply 33 being located at a distance from the equatorial plane which is slightly greater than the axial distance from the end of the strand below said ply. The thickness of the profiled element $P_1$, shown more clearly in FIG. 2, measured level with the end of the ply 33, is equal to 1.25 mm, or 36% of the total thickness of rubber between the cables respectively of the two plies 32 and 33, said thickness being measured between the generatrices of cables and at said least wide end of the ply. The thickness of the edging rubber $G_1$, in the case described, is equal to 1.2 mm, and the secant moduli of elasticity under tensile force $MC_2$, $MG_1$, $MP_1$ respectively of the liner $C_2$ of the ply 33, of the edging rubber $G_1$ and of the profiled element $P_1$ are equal to 11 MPa, 9 MPa and 3 MPa, and satisfy the formula $$MC_2 \geq MG_1 > MP_1$$

Figure 2:
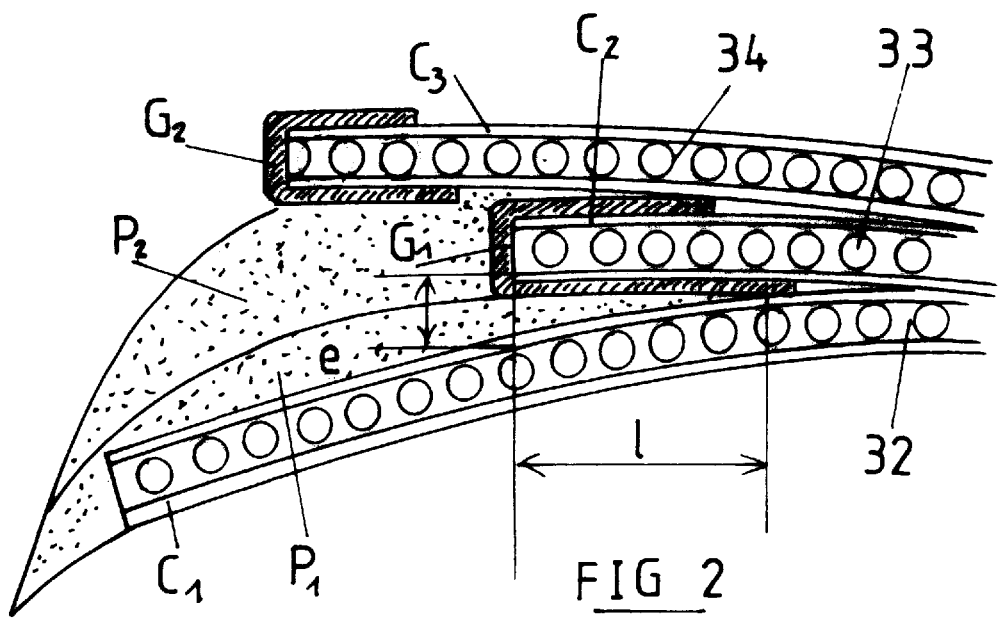
FIG. 2 is an enlarged view of the edges of the plies of the crown reinforcement in a second variant of the invention.

The crown reinforcement shown in FIG. 2 differs from that of FIG. 1 by the fact that the protective ply 34 has an axial width $L_{34}$ of 260 mm and that it is formed of cables forming with the circumferential direction an angle of 26% oriented in the same manner as those of the ply 33, and that the width $L_{33}$ of the working ply 33 is equal to 212 mm. The result is that we have two pairs of plies of cables which are crossed from one ply to the next: a first pair formed by the plies 32 and 33 with the ply 33 being the least wide, and the pair formed by the plies 32 and 34 with the ply 34 as being the least wide. Although the joint between the plies 33 and 34 is less disadvantaged from the point of view of inter-ply separation, the optimum solution, according to the invention, consists in arranging radially to the inside of each ply considered to be the least wide, that is to say the plies 33 and 34, an edging rubber $G_1$ beneath the ply 33, and $G_2$ beneath the ply 34, the profiled elements $P_1$ on one hand effecting the joint with the liner $C_1$ of the axially widest ply 32, and secondly $P_2$ effecting the joint with the profiled element $P_1$ which in turn is linked to the liner $C_1$ of the ply 32. In the case described, the edging rubber $G_1$ is turned up over the edge of the working ply 33, and the same applies to the edging rubber $G_2$, which is turned up over the edge of the ply 34. As for the secant moduli of elasticity of the edging rubbers, the profiled elements and the ply liners respectively, they satisfy the following relationships:

$$MC_2 \geq MG_1 > MP_1 \text{ and } MC_3 \geq MG_2 > MP_2,$$

if the liner of the ply 32 is referred to as $C_1$, the liner of the ply 33 as $C_2$ and the liner of the ply 34 as $C_3$. The liners $C_1$ and $C_2$, in the example in question, are identically constituted and have the same properties; the same applies to the two edging rubbers $G_1$ and $G_2$, which do not differ from the point of view of constitution and properties; the two profiled elements $P_1$ and $P_2$ are also constituted of one and the same rubber mix. It is of course understood that the liners may differ from each other, the edging rubbers may differ from each other and the profiled elements may also differ, to the extent that their secant moduli of elasticity under tension satisfy the above relationship. As in the case of FIG. 1, the axially inner end of the radially upper strand of the edging rubber $G_1$ surrounding the end of the ply 33 is slightly farther from the equatorial plane than the axially inner end of the radially inner strand of said rubber $G_1$. As for the end of the radially lower strand of the edging rubber $G_2$, it may either be closer to the equatorial plane than the axially inner end of the radially upper strand of the rubber $G_1$, or, on the contrary, farther away therefrom. The position of the axially inner end of the radially upper strand of the rubber $G_2$ is of no importance provided that it is ensured that the end of the ply 34 is covered.

Tires corresponding to the structure described in accordance with FIG. 1 were compared with tires, the crown reinforcement of which was formed of the same crown plies, but with edges of working plies 32 and 33 which are separated by simple profiled elements of rubber mix, the elasticity modulus of which at 10% is slightly less than the same modulus of the liner which is identical for the two plies, and the edges of plies 33 and 34 which are separated by the single layer of rubber formed by the two identical calendering thicknesses respectively of the plies 33 and 34. Comparative running of the tires in question yields an average advantage of 20% in mileage covered on a motorway circuit, that is to say, a circuit where the percentage of straight lines covered is very high, and the same advantage of 20% in mileage covered on a so-called high-drift circuit, that is to say, a circuit where the percentage of curves is highest, the load and inflation pressure conditions being the same for both types of travel and those recommended by the tire manufacturers.

I claim:

1. A tire having a radial carcass reinforcement, which is anchored within each bead to at least one bead wire, and is surmounted by a crown reinforcement comprising at least two plies of reinforcement elements, which are parallel to each other within each ply and are crossed from one ply to the next, said two plies being of unequal axial widths, each edge of the ply which is axially less wide of at least a pair of crossed plies being separated from the axially widest ply of the same pair by a profiled element P of rubber mix, the axially outer end of which is located at a distance from the equatorial plane of the tire which is at least equal to the distance between said plane and the end of the widest ply, said profiled element P itself being separated from the liner C contacting the reinforcement elements of the least wide ply by an edging rubber G, the axially outer end of which is located at a distance from said plane which is at least equal to half the width of the least wide ply, the tire characterized in that said profiled element P, said edging rubber G and said liner C have respectively secant moduli of elasticity under tension at 10% relative elongation MP, MG, MC such that $MC \geq MG > MP$, the thickness of the edging rubber being at least equal to 15% of the total thickness of rubber mix between generatrices of cables respectively of the two plies.

2. A tire according to claim 1, characterized in that the edging rubber G has its axially inner end located at a distance from the equatorial plane which is at most equal to the distance between said plane and the axially inner end of said profiled element P.

3. A tire according to claim 1, characterized in that the edging rubber G is turned up over the edge of the least wide crown ply, so as to coat completely the ends of the reinforcement elements forming said ply.

4. A tire according to claim 1, characterized in that the thickness of the profiled element P, measured at the end of the least wide ply, is between 30 and 80% of the total thickness of rubber mix between generatrices of cables respectively of the two plies.

* * * * *

UNITED STATES PATENT AND TRADEMARK OFFICE
CERTIFICATE OF CORRECTION

PATENT NO.    : 6,536,496 B1                                          Page 1 of 1
DATED         : March 25, 2003
INVENTOR(S)   : Bondu It is certified that error appears in the above-identified patent and that said Letters Patent is hereby corrected as shown below:

Column 1,
Line 33, "owning" should read -- owing --

Column 3,
Line 43, "HIS" should read -- H/S --

Signed and Sealed this

Twenty-third Day of September, 2003

JAMES E. ROGAN
*Director of the United States Patent and Trademark Office*